(No Model.)
R. S. TUCKER.
CARRIAGE.
No. 340,466. Patented Apr. 20, 1886.
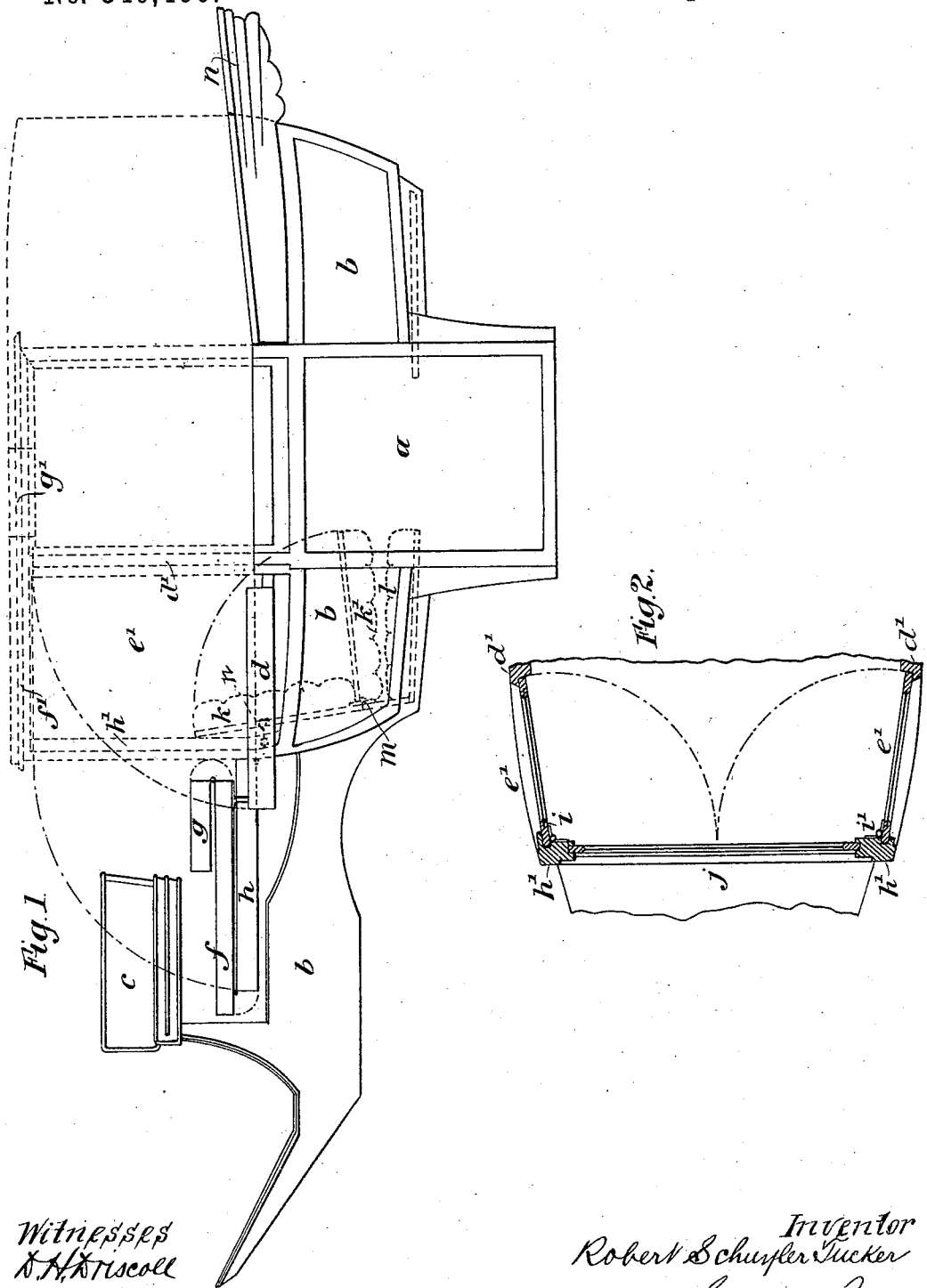
Witnesses
D. H. Driscoll
R. J. Cody.
Inventor
Robert Schuyler Tucker
by Gifford & Brown
Attys

UNITED STATES PATENT OFFICE.

ROBERT SCHUYLER TUCKER, OF FLUSHING, NEW YORK.

CARRIAGE.

SPECIFICATION forming part of Letters Patent No. 340,466, dated April 20, 1886.

Application filed February 27, 1886. Serial No. 193,450. (No model.)

*To all whom it may concern:*

Be it known that I, ROBERT SCHUYLER TUCKER, of Flushing, Long Island, State of New York, have invented a new and useful Improvement in Carriages, of which the following is a specification.

My invention is especially adaptable to that class of carriages which is commonly known as "landaus;" and it consists in hinging the back of the forward seat in such a way as to permit the side lights to be folded upon the front light in converting the carriage from a closed carriage into an open one.

In the drawings, Figure 1 represents a side view of the body of the carriage, the full lines representing the carriage-top down, as when the carriage is open, and the broken lines representing the carriage-top up, as when the carriage is closed. Fig. 2 represents a horizontal section showing the relative positions of the front and adjacent side lights of the carriage.

$a$ is the door. $b$ is the body.

$c$ is the driver's seat, which is hinged at the front, so as to be capable of being thrown forward to allow the top to be folded beneath it, as is customary in this class of carriages.

$d'$ is the frame, which, while in the position shown in dotted lines, forms the door-frame, and also the sash, for the side light, $e'$. This part $d'$ is pivoted to the body of the carriage at its lower end, and, when the carriage is open, is swung forward on this pivot into a horizontal position, as at $d$, Fig. 1.

$f'$ $g'$ are respectively sections of the top, which are hinged together, and also to the frame $h'$, forming the front of the carriage. All these parts occupy, when the carriage is open, the positions $f$, $g$, and $h$, respectively, which is accomplished by throwing $h$, which is hinged to the frame of the carriage at its bottom, forward into a horizontal position below the driver's seat, and folding the parts $f$ and $g$ upon it in that position. The side lights, $e'$ $e'$, are pivoted at $i'$ $i'$ to the frame $h$, so that they may be swung inward and lie against the interior of the front glass or panel, $j$, while the frame $h$ is still in a vertical position, and then, as the frame $h$ is swung forward into the horizontal position shown in Fig. 1, it carries with it the two side lights $e'$ $e'$, which are thus in the folded position below the panel or top section, $f$.

$k$ shows the position of the back of the forward seat, $l$, both when the carriage is open and when it is closed. Heretofore the back $k$ of this seat has been fixed, and consequently it could not extend higher than the lower level of the glasses or lights $e'$ without interfering with their being folded upon the light or panel $j$, as above described. It has therefore heretofore been customary to construct the back $k$ so low as to make it very uncomfortable to a person occupying the forward seat. It will be seen from the drawings that the back $k$ is constructed so as to extend considerably above the level of the bottom of the lights $e'$ $e'$, and thus to form an exceedingly comfortable seat. This advantage I am enabled to secure by having the back $k$ hinged at $m$ in such manner that it may, when required, be thrown forward into the position shown in dotted lines at $k'$, in which position it will not obstruct the folding of the other parts, and especially the side lights, $e'$, as heretofore described.

The operation of the parts is as follows: When it is desired to open the carriage, the seat-back $k$ is thrown forward into the position shown at $k'$. The side lights, $e'$ $e'$, are then swung inward, so as to lie against the front light, $j$. The driver's seat is then thrown forward, and the parts are folded under the driver's seat in the position shown at $f$, $g$, and $h$. The top of the rear of the carriage is folded, as at $n$, in the ordinary manner; likewise the door lights or windows. When all of the various other parts have been disposed of, the back is returned to its normal position at $k$ and the carriage is in the condition to be used as an open carriage. A hook, $n$, may be employed for holding the seat-back in position.

The chief advantage of my improvement lies in the fact that it enables me to increase the height of the back of the forward seat to an extent which will make it as comfortable as may be desired.

What I claim as my invention, and desire to secure by Letters Patent, is—

1. In combination with the forward seat, $l$, the back $k$, adapted to swing downward, and the forward frame, $h$, and side panels or lights, $e'$, adapted to be folded, substantially as described.

2. In combination, the forward frame, $h$, pivoted to the carriage-body, the side panels or lights, $e'$, pivoted to the frame $h$, the forward seat, $l$, and the back $k$ thereof, adapted to be swung downward and extending upward above the level of the bottoms of side lights or panels $e'$, substantially as described.

ROBERT SCHUYLER TUCKER.

Witnesses:
 D. H. DRISCOLL,
 R. J. CODY.